United States Patent [19]

Schmidt

[11] 4,414,494
[45] Nov. 8, 1983

[54] REGULATION OF THE SCAN WIDTH OF A RASTER SCANNED CRT DEFLECTION SYSTEM

[75] Inventor: Terrance C. Schmidt, Waterloo, Canada

[73] Assignee: Electrohome Limited, Kitchener, Canada

[21] Appl. No.: 251,517

[22] Filed: Apr. 6, 1981

[51] Int. Cl.³ .................... H01J 29/70; H01J 29/72
[52] U.S. Cl. .................................. 315/395; 315/387
[58] Field of Search ............... 315/387, 395, 397, 393, 315/389

[56] References Cited

U.S. PATENT DOCUMENTS

| | | | |
|---|---|---|---|
| 3,965,390 | 6/1976 | Spencer, Jr. | 315/389 |
| 3,983,452 | 9/1976 | Bazin | 315/387 |
| 4,164,688 | 8/1979 | Cushing | 315/389 |

*Primary Examiner*—Theodore M. Blum
*Attorney, Agent, or Firm*—Sim & McBurney

[57] ABSTRACT

The input voltage to the deflection system of a raster scanned CRT is made variable and is controlled by a feedback network in such a way that the width of the raster remains constant regardless of scanning frequency variations.

5 Claims, 4 Drawing Figures

FIG.1
(PRIOR ART)
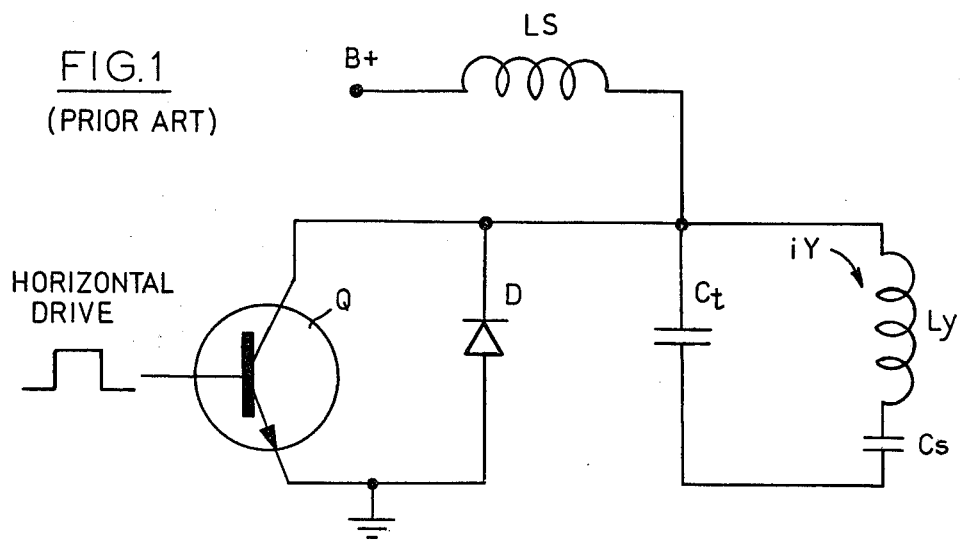
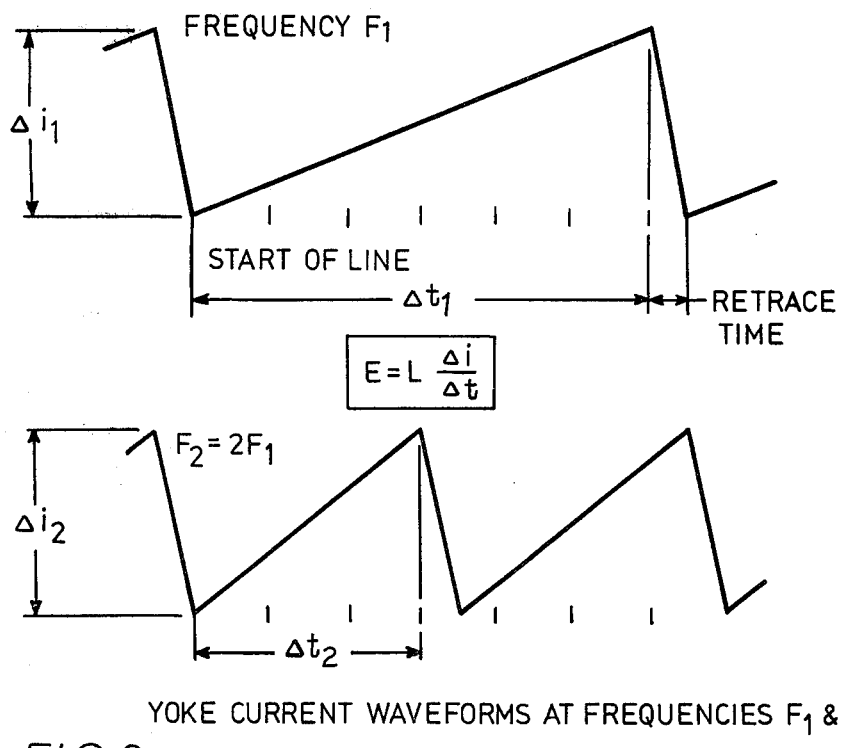
YOKE CURRENT WAVEFORMS AT FREQUENCIES $F_1$ & $F_2$
FIG.2

REGULATION OF THE SCAN WIDTH OF A RASTER SCANNED CRT DEFLECTION SYSTEM

BACKGROUND OF THE INVENTION

This invention relates to systems for regulating the horizontal scan width of a raster scanned CRT deflection system. The invention is particularly useful in conjunction with computer terminal displays, and data/graphics video projectors, for example, which may employ a very wide range of non-television standard horizontal scan rates.

A standard shunt efficiency television line output system will both drastically change the picture size as well as the CRT anode voltage if adjusted over a wide range of operating frequencies. In copending U.S. patent application Ser. No. 250,262 filed Apr. 2, 1981 entitled Regulation of the EHT Voltage of a CRT there is disclosed a network that overcomes the latter problem. In accordance with the instant invention there is disclosed herein a network that overcomes the former problem.

SUMMARY OF THE INVENTION

According to one aspect of this invention there is provided in combination with a horizontal scanning system for a CRT, said system being of the resonant shunt efficiency type and including a damper diode, a tuning capacitor, a decoupling capacitor, switching means and a horizontal deflection coil; means for supplying a variable frequency valve signal to said scanning system to produce a horizontal scan of variable frequency; a variable output voltage power supply for supplying a variable power supply voltage to said horizontal scanning system; means for deriving an error signal indicative of a change in magnitude of the peak to peak deflection current in said coil from a predetermined magnitude; and means for supplying said error signal to said variable output voltage power supply to decrease said magnitude of said peak to peak voltage in response to an increase in said deflection current and to increase said voltage in response to a decrease in said magnitude of said peak to peak deflection current, thereby to maintain said magnitude of said peak to peak deflection current substantially constant regardless of changes in frequency of the horizontal scan.

BRIEF DESCRIPTION OF THE DRAWINGS

This invention will become more apparent from the following detailed description, taken in conjunction with the appended drawings, in which:

FIG. 1 shows a conventional shunt efficiency line output stage;

FIG. 2 is a diagram illustrating horizontal yoke current waveforms in the horizontal deflection coil of FIG. 1 at two different frequencies $F_1$ and $F_2$;

Referring to FIG. 1, a standard shunt efficiency line output stage consisting of a power switching transistor Q, a damper diode D and a tuning capacitor $C_t$ is shown, these components being connected as indicated in the Figure. Ly is the horizontal deflection coil, Ls is a isolation coil and Cs is a D.C. blocking capacitor.

The operation of the shunt efficiency line output stage shown in FIG. 1 is well known. The conduction of transistor Q is controlled by the horizontal drive network (not shown) which is connected to the base of transistor Q. The horizontal drive signal applied to the base of transistor Q is, in the instant invention, a signal that can vary widely in frequency.

An operating cycle may be considered to begin with the scan at the centre of the screen. At this time transistor Q is turned on and becomes a low impedance path. As a consequence, coil Ly is connected across a voltage supply (B+) and current increases in the coil are linear with time. At the right extreme of the CRT screen, transistor Q is switched off rapidly, abruptly breaking the flow of current from the power supply to coil Ly. However, current continues to flow in coil Ly but in the opposite direction as the magnetic field about the coil collapses returning its energy. The energy stored in the coil field, in fact, now is transferred to capacitor Ct, since capacitor Ct and coil Ly form a resonant circuit. A high voltage pulse is developed across capacitor Ct, and the oscillation of capacitor Ct and coil Ly is allowed to continue for one-half cycle, during which the current in coil Ly falls to zero. In the latter part of this half-cycle the energy stored in capacitor Ct is transferred back to coil Ly, so that its current increases from zero but in a negative direction. At the same time the voltage across capacitor Ct falls until it has reached zero and then begins a negative excursion. As the voltage across capacitor Ct tends to swing negative, damper diode D conducts, and damper current allows the transfer of energy stored in the magnetic field of coil Ly back to the B+ supply with the current in coil Ly decreasing linearly toward zero and effecting scan from the left to the centre of the screen, thus accomplishing a complete cycle involving scan from the centre of the screen to the righthand side, retrace and scan from the lefthand side to the centre of the screen.

Referring to the waveforms shown in FIG. 2 and the governing equation also shown in that Figure, it can be seen that with a constant B+ input voltage, if the frequency of operation (and thus $\Delta t$) is changed, the peak to peak current in the horizontal deflection coil also will change proportionately. Since picture width is dependent on this current, it is this peak to peak current that must be maintained constant for constant picture width.

If the equation is rearranged as follows: $\Delta i = E/L \times \Delta t$, it can be seen that to maintain a constant $\Delta i$ with a changing $\Delta t$ (variable frequency), the only practical answer is to vary the input voltage E, since the inductance L cannot be varied.

Figure 3:
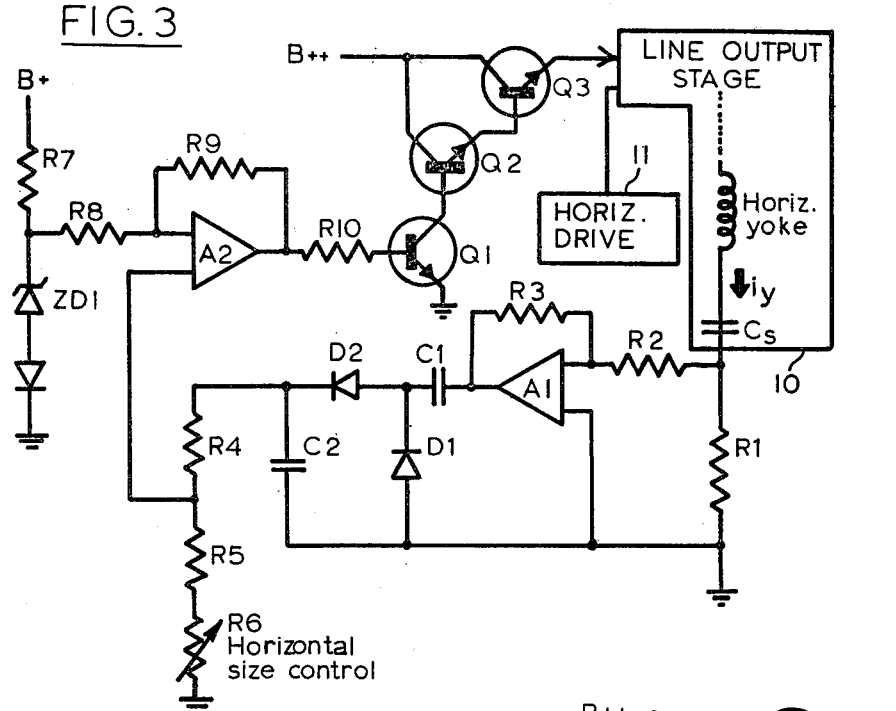
FIG. 3 is a circuit diagram illustrating one embodiment of the instant invention.

In accordance with the instant invention, the foregoing objective is achieved, in one embodiment of the invention, using the network shown in FIG. 3. Referring to that Figure, the line output stage of FIG. 1 including coil Ly and capacitor Cs is shown at 10. The horizontal drive network is indicated at 11 and, as previously indicated, provides variable frequency drive pulses to the shunt efficiency line output stage 10. The latter is powered from B++ via a variable output voltage power supply, details of which follow herein.

The horizontal deflection current is passed through a small resistor $R_1$ and thus generates a small voltage across resistor $R_1$ which is proportional to horizontal deflection current. This voltage is amplified by operational amplifier $A_1$ and with its negative peak clamped to ground by diode $D_1$ and capacitor $C_1$, it is peak rectified by diode $D_2$. The resultant D.C. voltage is a direct measure of picture width, being directly proportional to the peak to peak current in yoke Ly. This D.C. voltage is applied to a resistive divider consisting of resistors $R_4$, $R_5$ and $R_6$, the output of which is applied to one input of a linear comparitor $A_2$. The other input to linear comparitor $A_2$ is a reference voltage from a Zener diode $ZD_1$. The error signal output of linear comparitor $A_2$ drives the base of a transistor $Q_1$ which, in turn, controls the voltage output of cascaded emitter followers $Q_2$ and $Q_3$, which output is supplied directly to the horizontal output stage. The feedback loop hereinabove described compensates for higher or lower operating frequency by automatically turning up or down respectively the B+ to the horizontal output stage to maintain a constant peak to peak horizontal deflection current. In this way the picture width is effectively regulated. In other words, the network consisting of transistors $Q_1$, $Q_2$ and $Q_3$ constitutes a variable output voltage power supply and, of course, other types of such variable output voltage power supplies may be used without departing from this invention. The power supply receives an error signal from comparitor $A_2$. If the scan frequency has increased, the nature of the error signal will be such as to increase the output voltage of the power supply to an extent sufficient to keep the peak to peak horizontal deflection current constant. If the scan frequency has decreased, the nature of the error signal will be such as to decrease the output voltage of the power supply to an extent sufficient to maintain peak to peak horizontal deflection current, and hence scan width, constant.

Figure 4:
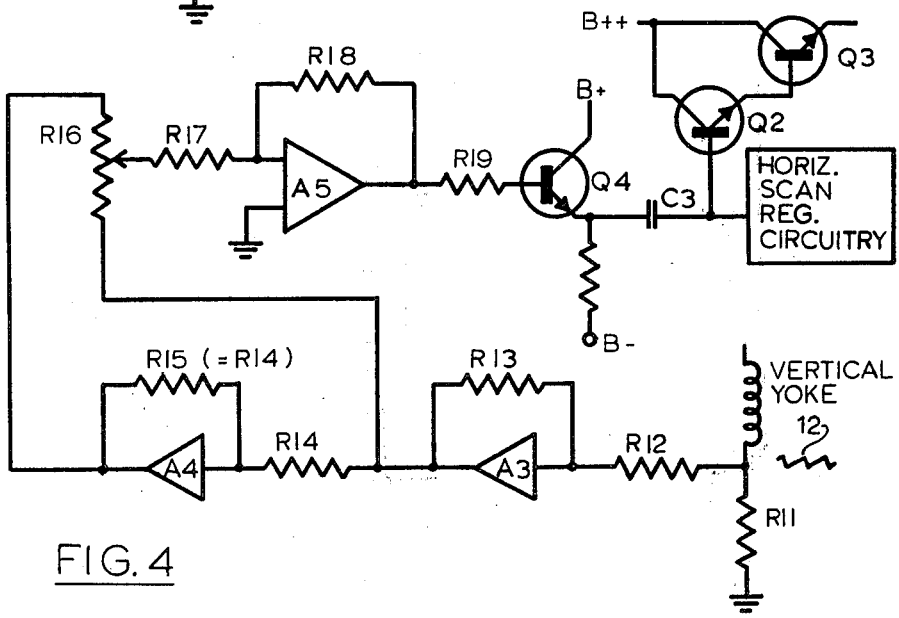
FIG. 4 illustrates a network which can be used in conjunction with the network of FIG. 3 for the purpose of keystone adjustment.

Turning now to FIG. 4, and considering a data/graphics video projector, the latter does not normally sit directly on-axis with the vertical centre of the screen because of interference with audience line of sight. It is usually lower or higher, except in some rear screen applications. This causes varying amounts of geometric distortion of the picture. This is known as keystoning, due to the unequal throw distances to the top and bottom of the screen. Optical focusing can be optimized by a lens tilt adjustment with respect to the CRT, but picture keystone correction must be done electrically.

The correction that is required is a linear variation in picture width during vertical scanning. In other words, a sawtooth voltage waveform in synchronization with the vertical rate must be applied to the horizontal deflection coil. It must be bi-directional and customer accessible because of the unknown mounting relationship with respect to the screen in various installations, for example, floor mount, ceiling mount, and rear screen applications.

A keystone adjustment circuit to serve the foregoing function is shown in FIG. 4. A vertical ramp waveform 12 already is available in the vertical deflection circuit at resistor $R_{11}$ and is amplified by an operational amplifier $A_3$ and inverted by an operational amplifier $A_4$. Thus, identical but inverted vertical ramp waveforms are applied at both ends of keystone control potentiometer $R_{16}$. This means that with one control any level of positive, negative or zero (centered) correction waveform can be selected to appear at a buffer stage $A_5$ by varying the location of the slider of potentiometer $R_{16}$. At this point a bipolar transistor $Q_4$ current buffers the waveform which is applied via a large capacitor $C_3$ to the base of the first emitter follower transistor $Q_2$ in the variable output voltage power supply shown in FIG. 3. In this way the B+ available to the line output stage at the bottom of the screen, and thus picture width, can be greater than at the top, and vice-versa, to compensate for optical keystone. Being capacitively coupled, the keystone circuit has no effect on the average regulated picture width.

While preferred embodiments of this invention have been disclosed herein, those skilled in the art will appreciate that changes and modifications may be made therein without departing from the spirit and scope of the invention as defined in the appended claims.

I claim:

1. In combination with a horizontal scanning system for a CRT, said system being of the resonant shunt efficiency type and including a damper diode, a tuning capacitor, a decoupling capacitor, switching means and a horizontal deflection coil; means for supplying a variable frequency drive signal to said scanning system to produce a horizontal scan of variable frequency; a variable output voltage power supply for supplying a variable power supply voltage to said horizontal scanning system; means for deriving an error signal indicative of a change in magnitude of the peak to peak deflection current in said coil from a predetermined magnitude; and means for supplying said error signal to said variable output voltage power supply to decrease said voltage in response to an increase in said magnitude of said peak to peak deflection current and to increase said voltage in response to a decrease in said magnitude of said peak to peak deflection current, thereby to maintain said magnitude of said peak to peak deflection current substantially constant regardless of changes in frequency of the horizontal scan.

2. The invention according to claim 1 wherein said means for driving said error signal include means for deriving a D.C. voltage that is proportional to the peak to peak value of said deflection current in said coil and for comparing said D.C. voltage to a D.C. voltage of predetermined magnitude.

3. The invention according to claim 1 including a vertical deflection coil; means for driving therefrom a vertical deflection waveform; means for inverting said vertical deflection waveform; means for applying said vertical deflection waveform and the inverted vertical deflection waveform to opposite ends of a potentiometer; means for deriving from said potentiometer a correction voltage; and means for utilizing said correction voltage to change said power supply voltage supplied to said horizontal scanning system to increase or decrease said deflection current in said horizontal deflection coil at the top or bottom of the scan to compensate for optical keystone.

4. The invention according to claim 2 including a vertical scanning system including a vertical deflection coil providing a vertical deflection waveform, and means for varying said power supply voltage in response to variations in said vertical deflection waveform to compensate for optical keystone.

5. The invention according to claim 2 including a vertical scanning system including a vertical deflection coil providing a vertical deflection waveform, means for inverting said vertical deflection waveform to provide an inverted vertical deflection waveform, and means for varying said power supply voltage in response to either said vertical deflection waveform or said inverted vertical deflection waveform to compensate for optical keystone.

* * * * *